Jan. 26, 1943.  C. DUMELIN  2,309,242
VEHICLE TOP
Filed June 12, 1942  2 Sheets-Sheet 1
FIG. 1  SHEET 1.
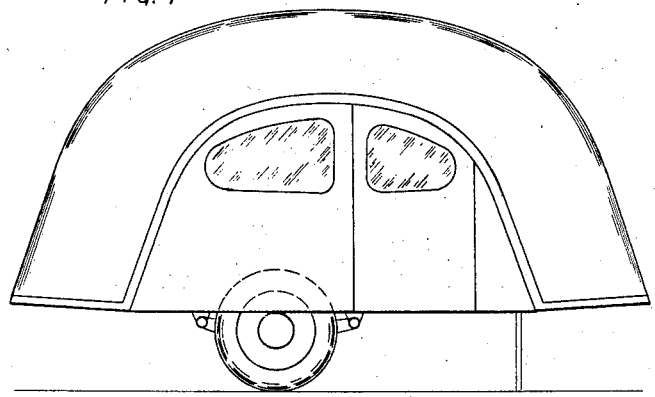
FIG 2
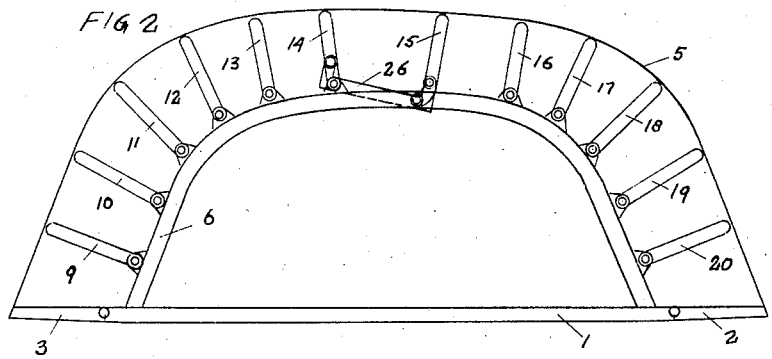
FIG 3
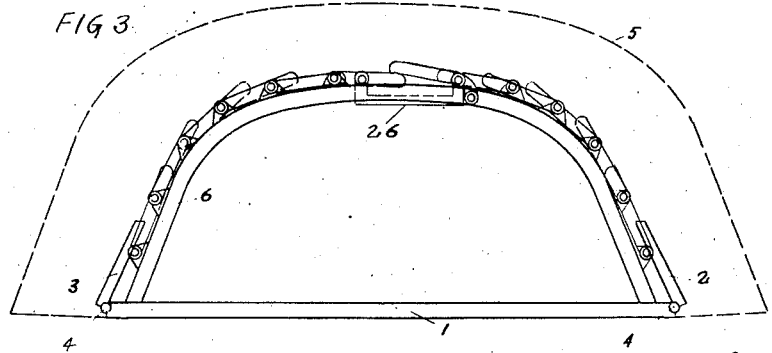
Charles Dumelin
INVENTOR.
BY Jan. 26, 1943.   C. DUMELIN   2,309,242
VEHICLE TOP
Filed June 12, 1942   2 Sheets-Sheet 2
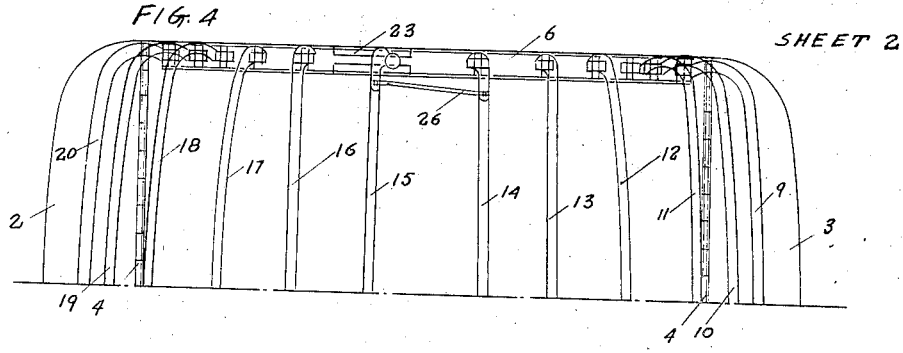
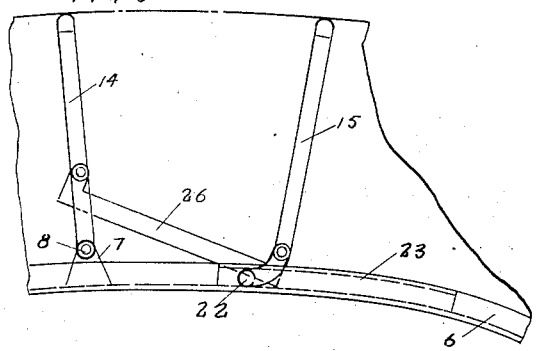
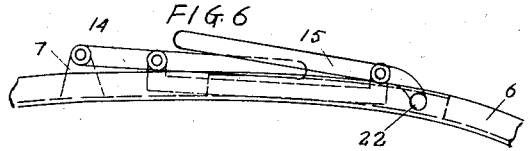
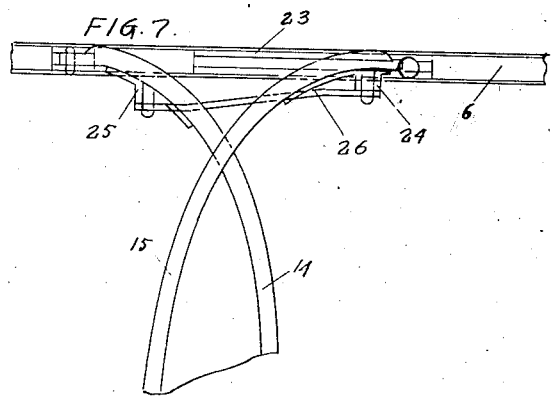
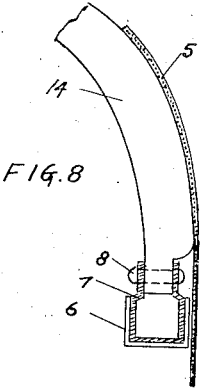
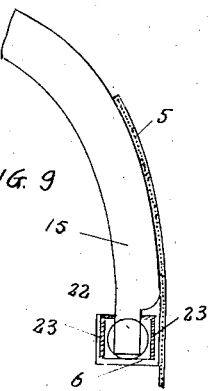
Charles Dumelin
INVENTOR.
BY Patented Jan. 26, 1943

2,309,242

UNITED STATES PATENT OFFICE 2,309,242

VEHICLE TOP

Charles Dumelin, Detroit, Mich.

Application June 12, 1942, Serial No. 446,704

3 Claims. (Cl. 296—105)

My invention relates to a vehicle top and more particularly to a folding top for camp trailers, whereby a trailer equipped with this new top may readily be converted into a smaller size vehicle for traveling purposes on the road, or said top may be stretched out at any convenient camping place if the use of the trailer is desired.

The object of the invention is to provide a new vehicle top of the class mentioned which will be exceedingly simple in construction, cheap of manufacture and efficient in use.

A further object is; part of the front and rear sections are collapsible and assume a collapsed position with the contour of the folded bows forming an arch.

A still further object is; the top is provided with two arch shaped roof rails secured to a platform and a plurality of bows connected to said rails and supporting the top covering. One of the bows being slidably connected to the roof rails, this bow having a pair of links attached to an adjoining bow and readily sliding out of the way when the rear half of the top is folded.

With the above mentioned and other ends in view, the invention consists in a novel construction, arrangement and combination of parts illustrated in one of its embodiments in the accompanying drawings and particularly pointed out in the appended claims.

Referring to the drawings forming a part to this specification.

Fig. 1 is a side elevation of a trailer with the vehicle top constructed in accordance with the invention and equipped with the necessary foldable parts required for such a vehicle top.

Fig. 2 is a side elevation of the top illustrating the arch shaped top rails, the front and rear section of the foldable platform and the spaced cross bows.

Fig. 3 is a side elevation of the folded top and the front and rear end, showing their normal position with the bows about the arch shaped roof rails when collapsed. Fig. 4 is an illustration of a plan view of the top, the foldable parts are in a stretched out position.

Fig. 5 is a side elevation of the two center bows showing the sliding and link connections.

Fig. 6 is another side elevation of the two center bows in a folded position.

Fig. 7 is a fragmentary plan view of Fig. 5 and Fig. 6 of the drawings. Fig. 8 is a sectional view of the roof rail with a cross bow, bracket and pivot pin secured together. Fig. 9 is a sectional view of the roof rail part of a cross bow with a ball secured thereto and a pair of guide plates secured to the roof rails, the bow being slidably held to the rails by the guide plates.

Similar numerals of reference designate the same parts throughout all the figures. I indicate 1 the trailer platform, 2 the collapsible front and 3 the collapsible rear of the platform. I designate 4 the hinges connecting the front and rear construction with the main platform as best shown in Fig. 4 of the drawings.

In supporting or folding the top covering 5 relative to the roof rails 6 I provide a plurality of cross bows. The cross bows are provided with brackets 7 and pivot pins 8 and connected to the roof rails at given positions. One of said bows has a sliding connection by means of a ball 22 secured to each end as shown.

This ball is slidably held to the rails by guide brackets 23. The sliding bow is provided with brackets 24 and the adjoining bow has brackets 25 secured thereto. Means consisting of a pair of links 26 pivotally connects the two bows together as best shown in Figs. 5, 6, and 7 of the drawings.

The folding of the top is illustrated in the following manner; by folding the rear end of the platform, cross bows 9, 10, 11, 12, 13 and 14 pivot down over the roof rails and force the sliding bow 15 out of its original position. By folding the front end of the platform the remaining bows 15, 16, 17, 18, 19 and 20 pivot down over the roof rails. As a means of holding the folded parts in position about the roof rails, I use straps connecting the end sections together.

From the foregoing description, taken in connection with the accompanying drawings the operation and advantages of my invention, will be readily understood.

I have thus described one of the embodiments of my invention without having attempted to set forth all the forms in which it may be made, or all the modes of its use.

What I claim and desire to secure by Letters Patent is:

1. A vehicle top of the folding type comprising two arch shaped roof rails secured to a trailer platform, the front end and the rear end of said platform being collapsible, means consisting of a plurality of cross bows pivotally secured to the roof rails, said bows being provided with brackets and pivot pins at each end, one of the cross bows having a ball secured at each end and means consisting of guide plates slidably holding the latter to the roof rails, comprising brackets and links connecting said sliding bow with an adjoining bow, the folding of the top covering being divided about the sliding bow, by folding the rear end of the platform the bows of the first half of the top pivot down over the roof rail and force the sliding bow out of its original position, and by folding the front end construction the remaining bows pivot down over the roof rails and strap means connect the folded parts together.

2. A vehicle top of the folding type comprising two arch shaped roof rails secured to a trailer platform, the front end construction and the rear end construction of the platform being collapsible by means of hinge attachments across the platform, a plurality of cross bows are provided with brackets and pivot pins for securement to the roof rails, one of the bows having a ball secured at each end and a pair of guide plates hold the bow slidably to the rails, said sliding bow being connected with an adjoining bow by brackets and links for sliding and folding purposes, the folding of the top covering being divided about the sliding bow, the rear half of the top folding forwardly and the front half of the top folding rearwardly giving the vehicle an arch shaped contour.

3. A vehicle top of the folding type, comprising two arch shaped roof rails secured to a trailer platform, said roof rails extending longitudinally along the sides of the platform, the front end and the rear end construction of the platform being collapsible by means of hinges secured across the latter, a plurality of bows with brackets and pivot pins being connected with the roof rails, one of said bows having a ball secured at each end and guide plates holding said bow slidably to the roof rails, this same bow being connected with an adjoining bow by bracket and a pair of links for folding and dividing the top covering between said two bows, the rear half of the top folding forwardly and the front half of the top folding rearwardly giving the vehicle an arch shaped contour.

CHARLES DUMELIN.